March 7, 1950     J. C. CHESBRO     2,499,722
PLUMB BOB, LINE, AND WINDING SPOOL
Filed Oct. 3, 1946
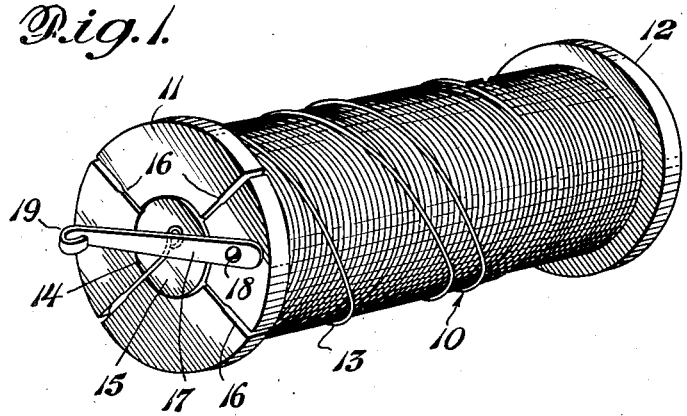
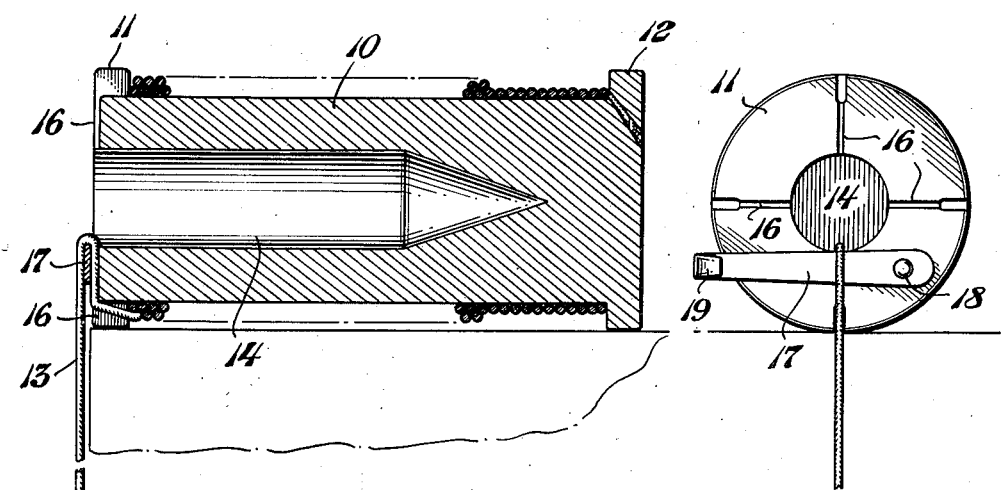
Inventor
James C. Chesbro,
By Munson Khare.
Attorney Patented Mar. 7, 1950

2,499,722

UNITED STATES PATENT OFFICE 2,499,722

PLUMB BOB, LINE, AND WINDING SPOOL

James C. Chesbro, Arcadia, Calif.

Application October 3, 1946, Serial No. 700,863

3 Claims. (Cl. 33—217)

The invention relates to a combined plumb bob, line and winding spool. According to my invention the spool is hollow so that the plumb bob may be housed therein when not in use. It is also adapted to have the plumb line wound thereon. A distinctive feature of my invention resides in the fact that one rim of the spool is provided with radial slots to permit passage of the cord therethrough, and a retaining clip is pivotally mounted on said rim the function of which is to retain the bob within the spool when the bob is not in use and to lock the line in one of the slots when the line and bob are in use. Thus the plumb bob and line are securely held in place without damage to themselves or to other tools and the line is prevented from unwinding and becoming tangled either when in use or when stored. Furthermore, the line may be locked at any desired length when the bob is in use. The bob is positively held in position by the locking clip rather than by line friction and may be easily and quickly released from the spool without unwinding any considerable quantity of line. When the bob is in use the line may be positioned in one of the slots and held in place at any desired length by the locking clip.

The invention will be more readily understood by reference to the accompanying drawing and the following detailed description, in which a specific embodiment thereof is set forth by way of illustration rather than by way of limitation.

In the drawings:

Fig. 1 is a perspective view of the combined device with the bob enclosed in the recess within the reel and the catch placed to retain the bob in position;

Fig. 2 is a sectional view through the reel, the bob shown in suspended position and the line clamped by means of the pivoted catch or clamping member; and Fig. 3 is a front view of the combined apparatus in the position shown in Fig. 2.

Referring in detail to the drawings, reference numeral 10 denotes a hollow spool cylindrical in form and having rims 11 and 12 at each end. A line 13 is wound upon the portion of the spool intermediate the rims 11 and 12 and is retained by said rims. The spool is recessed or hollowed out at 14 so as to receive a plumb bob 15 which is secured at one end to the line 13. The recess 14 corresponds in shape to that of the plumb bob 15.

As shown one of the rims 11 is provided with a series of radial slots 16, herein shown as four in number, the slots extending across the face and through the perimeter of the rim. These slots are adapted to receive the line either when the bob is housed within the spool or is in operation.

In order to clamp the line in position or to retain the bob within the spool to prevent accidental removal thereof a clip 17 is provided. This clip may be of metal or any suitable material, and as shown is pivoted at 18 to the face of the rim 11. The free end of the clip is rolled over as at 19 to provide a fingerpiece for moving the clip and also to provide means for holding the spool firmly in position when the bob is in depending position when in use. The clip serves to prevent accidental removal of the bob from the recess and may also be used to clamp the line against the face of the rim to hold the same in any adjusted position.

The operation of the device will be apparent from the foregoing description. Assuming the bob to be housed in the recess 14 and the line 13 wound upon the spool with the clip retaining the bob against accidental removal, it is only necessary to swing the clip about its pivot so as to permit the bob to be removed from the recess. The desired length of line is then unwound from the spool while the portion of the line adjacent the spool is passed through one of the slots 16 and is clamped in desired position by the clip member 17. The line may pass over the outer surface of the clip, thus spacing it slightly from the end of the spool. The spool may be supported in horizontal position and the bob and line extend downwardly from the rim of the spool. The bob is utilized in the ordinary manner and after use the clamp is swung away from the line and the line is rewound on the spool, leaving sufficient slack to enable the bob to be placed in the recess 14. Any remaining slack may then be taken up by winding on the spool and the line passed through the closest slot 16, after which the clamp is actuated to retain the bob in the recess, partially covering the opening to such recess. If the line is not taut the clamp may be moved over the line to take up any slack therein while still passing over a portion at least of the entrance to the recess so as to retain the bob in position.

The invention has been described in detail for the purpose of illustration, but it will be obvious that numerous modifications and variations may be resorted to without departing from the spirit of the invention.

I claim:

1. A combined plumb line reel and bob holder comprising a spool including a solid cylindrical body member having radially extending rims, one at each end thereof, to provide a line winding reel, the body member being axially cored from one end only thereof to correspond in size and shape with a conventional plumb bob so as to completely house the same and being closed at the other end to retain the bob within the reel, and line clamping means comprising a pivoted lever mounted on the face of the rim adjacent the opening, said lever serving also to releasably retain the bob in the spool when not in use.

2. combined plumb line reel and bob holder comprising a spool including a cylindrical body portion having radially extending rims one at each end thereof to provide a line supporting reel, said body portion being cored from one end only thereof to completely house a plumb bob, and a locking clip pivoted on the face of the rim adjacent the opening for releasably retaining the bob in position within the spool, said clip serving also as a line clamp when the bob is in use.

3. A plumb line reel and bob holder comprising a cylindrical body portion having radially extending arms one at each end thereof and having an axial opening extending inwardly from one end of the body portion to completely house the bob, the rim adjacent the bob receiving opening having a clip pivotally mounted on the face thereof adapted to be swung over the mouth of the opening to retain the bob in position, said clip serving also as a line clamp when the bob is in use.

JAMES C. CHESBRO.

REFERENCES CITED

The following references are of record in the file of this patent:

UNITED STATES PATENTS

| Number | Name | Date |
| --- | --- | --- |
| 266,671 | Bergen | Oct. 31, 1882 |
| 773,547 | Coleman | Nov. 1, 1904 |
| 1,044,014 | Butts | Nov. 12, 1912 |
| 1,324,171 | Propst | Dec. 9, 1919 |
| 1,411,621 | Goddard | Apr. 4, 1922 |
| 2,135,211 | Johnson | Nov. 1, 1938 |
| 2,265,126 | Bersche | Dec. 9, 1941 |
| 2,421,256 | Galford | May 27, 1947 |